(12) United States Patent
Suen et al.

(10) Patent No.: US 7,084,941 B2
(45) Date of Patent: Aug. 1, 2006

(54) LIQUID CRYSTAL DISPLAY DEVICE

(75) Inventors: Te-Hwei Suen, Hsin-Chu (TW); Yang-En Wu, Taipei (TW)

(73) Assignee: AU Optronics Corp., Hsin-Chu (TW)

( * ) Notice: Subject to any disclaimer, the term of this patent is extended or adjusted under 35 U.S.C. 154(b) by 28 days.

(21) Appl. No.: 10/709,027

(22) Filed: Apr. 8, 2004

(65) Prior Publication Data

US 2004/0212758 A1 Oct. 28, 2004

(30) Foreign Application Priority Data

Apr. 25, 2003 (TW) .............................. 92109801 A (51) Int. Cl.
*G02F 1/13* (2006.01)
(52) U.S. Cl. ........................................ 349/113; 349/95
(58) Field of Classification Search .................. 349/64, 349/113, 95
See application file for complete search history.

(56) References Cited

U.S. PATENT DOCUMENTS

| 5,914,759 | A * | 6/1999 | Higuchi et al. ............... 349/57 |
|---|---|---|---|
| 6,191,833 | B1 * | 2/2001 | Hirakata ....................... 349/61 |
| 6,222,598 | B1 * | 4/2001 | Hiyama et al. ................ 349/65 |
| 6,222,689 | B1 * | 4/2001 | Higuchi et al. .............. 359/837 |
| 6,309,080 | B1 * | 10/2001 | Sasako et al. ............... 362/620 |
| 6,334,690 | B1 * | 1/2002 | Ohkawa ....................... 362/613 |
| 6,364,497 | B1 * | 4/2002 | Park et al. .................... 362/627 |
| 6,404,468 | B1 * | 6/2002 | Niwano et al. ................ 349/64 |
| 6,515,785 | B1 * | 2/2003 | Cobb et al. .................. 359/247 |
| 6,568,819 | B1 * | 5/2003 | Yamazaki et al. ........... 362/619 |
| 6,595,652 | B1 * | 7/2003 | Oda et al. .................... 362/609 |
| 6,746,130 | B1 * | 6/2004 | Ohkawa ....................... 362/617 |
| 6,829,071 | B1 * | 12/2004 | Allen et al. .................. 359/247 |

\* cited by examiner

*Primary Examiner*—James A. Dudek
(74) *Attorney, Agent, or Firm*—Winston Hsu (57) ABSTRACT

A liquid crystal display device includes a liquid crystal display panel having two parallel substrates and a liquid crystal layer sealed between the substrates, a light source for generating light beams, and a dispersion film positioned between the liquid crystal display panel and the light source having a plurality of bar-like structures arranged along a first direction and facing the light source. The dispersion film is utilized for enabling brightness of the light beams generated from the light source to be increased as a viewing angle is increased, and further utilized for enabling the liquid crystal display device to display an image with uniform brightness.

19 Claims, 15 Drawing Sheets

LIQUID CRYSTAL DISPLAY DEVICE

BACKGROUND OF INVENTION

1. Field of the Invention

The present invention relates to a liquid crystal display device, and more specifically, to a liquid crystal display device capable of producing an image with uniform brightness at various viewing angles.

2. Description of the Prior Art

Since a liquid crystal display device (LCD) has the advantages of better portability, lower power consumption, and lower radiation, the LCD is widely used in various portable products, such as notebooks, personal data assistants (PDA), and video cameras, and the LCD replaces a conventional CRT monitor gradually.

Figure 1:
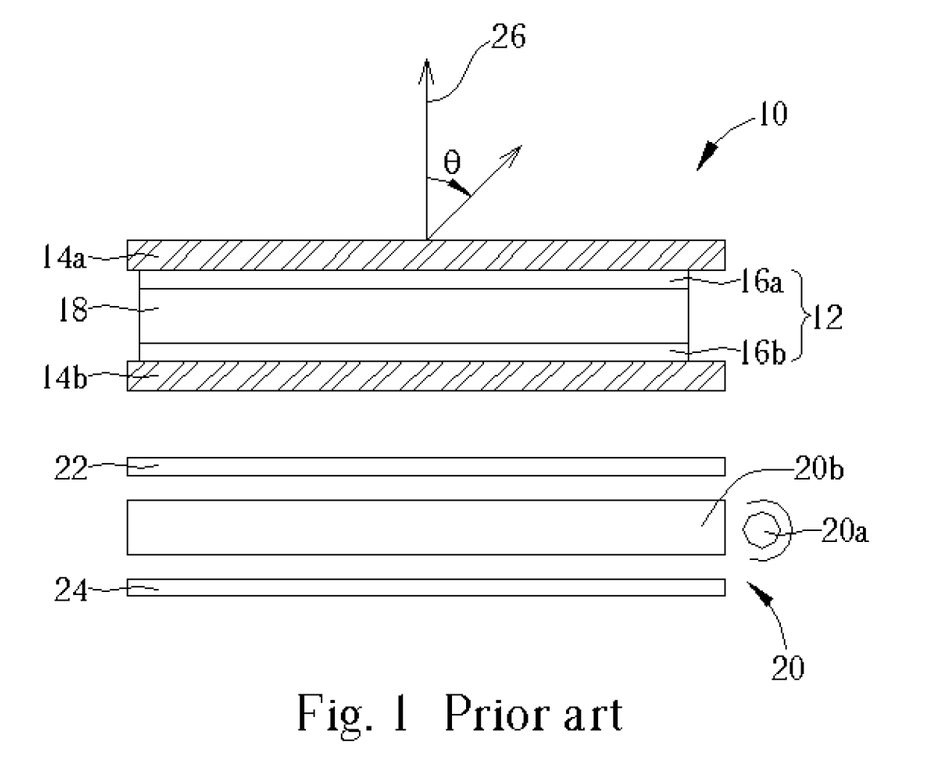
FIG. 1 is a sectional view of a prior art liquid crystal display device.

It is well known that incident light will produce different polarization or refraction when the alignments of liquid crystal molecules are different. Accordingly, the LCD utilizes the liquid crystal molecules with different alignments to control the light transmittance of each pixel unit so as to generate light beams with different intensities of gray level or to generate red, blue, and green lights with different brightness, so that the LCD is enabled to produce gorgeous images. Please refer to FIG. 1. FIG. 1 is a sectional view of a prior art liquid crystal display device. As shown in FIG. 1, a liquid crystal display device (LCD) 10 comprises a liquid crystal display panel 12 and a backlight module 20 positioned below the liquid crystal display panel 12. Generally, the LCD 10 further includes an upper polarizer (not shown) positioned on an upper surface of the liquid crystal display panel 12, and a lower polarizer (not shown) located between the liquid crystal display panel 12 and the backlight module 20.

Additionally, the liquid crystal display panel 12 has an upper substrate 14a, a lower substrate 14b, and a liquid crystal layer 18 sealed between the upper substrate 14a and the lower substrate 14b. The liquid crystal display panel 12 further includes transparent conductive layers 16a and 16b respectively formed on a lower surface of the upper substrate 14a and an upper surface of the lower substrate 14b. When the conductive layers 16a and 16b are applied with a voltage, the alignments of the liquid crystal molecules can be adjusted to control the light transmittance of each pixel unit. In addition, the backlight module 20 at least comprises a light source 20a for generating light beams, a light-guiding plate 20b for guiding the light beams, a diffuser 22 for equally distributing the light beams, and a reflective plate 24 for reflecting light beams into the liquid crystal display panel 12. Usually, the transparent conductive layers 16a and 16b both can be composed of indium tin oxide (ITO). The light source 20a can be a light emitting diode (LED) or a cold cathode fluorescent lamp (CCFL), and the light-guiding plate 20b is usually made of acrylic.

As shown in FIG. 1, the light beams generated from the light source 20a are firstly reflected by spots on a bottom of the light-guiding plate 20b, and then, the reflected light beams are ejected from the light-guiding plate 20b and enter the liquid crystal display panel 12. Therefore, the LCD 10 can display various images with the aids of the reflected light beams and other optical units, such as polarizers or color filters. Additionally, when a user watches the images displayed by the LCD 10, an intersecting angle between eyes of the user and the axis 26 that is perpendicular to a surface of the LCD 10 is defined as a viewing angle $\theta$.

Figure 2:
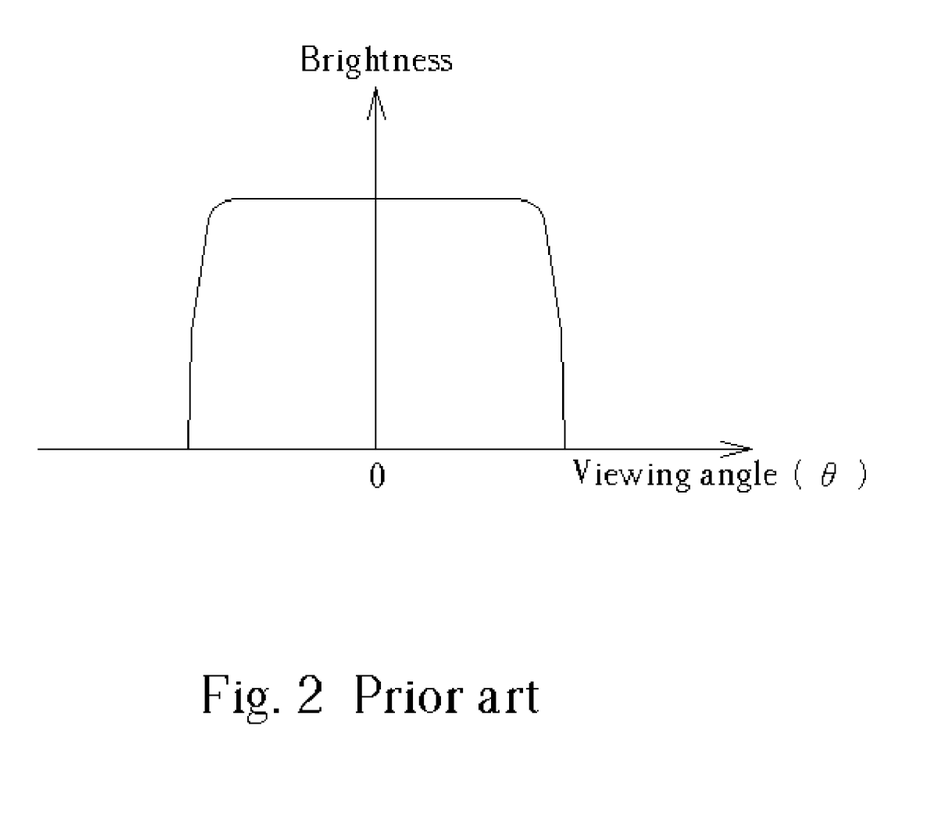
FIG. 2 is a simplified schematic diagram illustrating the relationship between the luminance provided by a backlight module and a viewing angle ($\theta$).

Referring to FIG. 2, FIG. 2 is a simplified schematic diagram illustrating the relationship between the luminance provided by a backlight module and a viewing angle ($\theta$). As shown in FIG. 2, the backlight module 20 generates light beams with uniform brightness at each viewing angle. Accordingly, the backlight module 20 can function to supply light beams with sufficient brightness and uniform distribution so that the LCD 10 can display high quality images.

Figure 3:
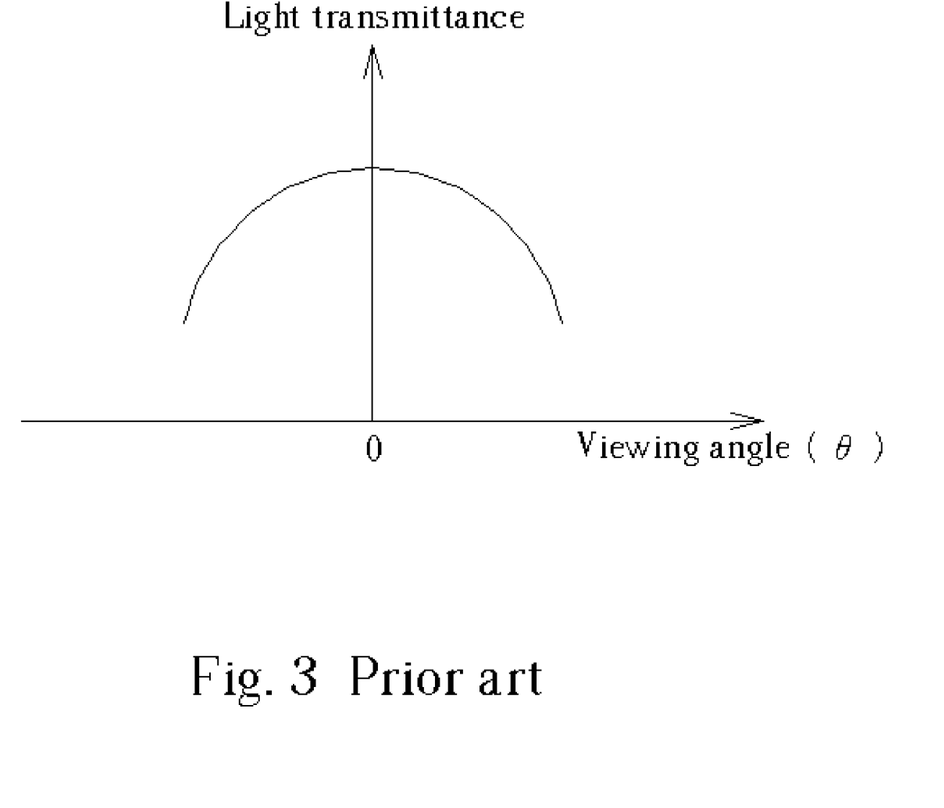
FIG. 3 is a simplified schematic diagram illustrating the relationship between the light transmittance of the LCD 10 and a viewing angle ($\theta$).
Figure 4:
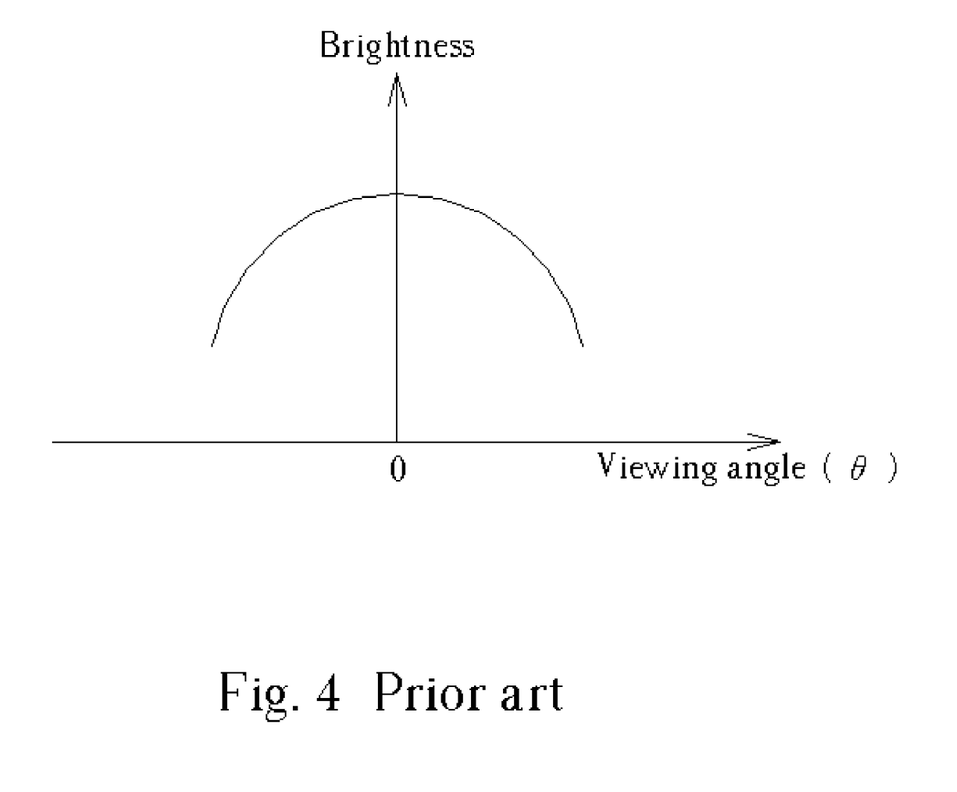
FIG. 4 is a simplified schematic diagram illustrating the relationship between the luminance displayed by the LCD 10 and a viewing angle (θ).

Referring to FIG. 3 and FIG. 4, FIG. 3 is a simplified schematic diagram illustrating the relationship between the light transmittance of the LCD 10 and a viewing angle ($\theta$). FIG. 4 is a simplified schematic diagram illustrating the relationship between the luminance displayed by the LCD 10 and a viewing angle ($\theta$). As shown in FIG. 3, the light transmittance of the liquid crystal display panel 12 gets smaller as the viewing angle becomes larger. Accordingly, even though the backlight module 20 can provide light beams with uniform brightness for the liquid crystal display panel 12, the brightness displayed by the LCD 10 still decreases as the viewing angle increases, as shown in FIG. 4. That is to say, as the user watches the images displayed by the LCD 10, the brightness observed by the user varies as the user changes his/her position, which prevents the user from enjoying the images displayed by the LCD 10 comfortably and easily.

SUMMARY OF INVENTION

It is therefore one object of the present invention to provide a liquid crystal display device capable of producing an image with uniform brightness at various viewing angles to solve the above-mentioned problem.

According to the present invention, a liquid crystal display device includes a liquid crystal display panel having two parallel substrates and a liquid crystal layer sealed between the substrates, a light source for generating light beams, and a dispersion film positioned between the liquid crystal display panel and the light source having a plurality of bar-like structures arranged along a first direction and facing the light source. The dispersion film is utilized for increasing brightness of the light beams generated from the light source as a viewing angle is increased, and further utilized for the liquid crystal display device to display an image with uniform brightness.

It is an advantage over the prior art that the present invention provides the liquid crystal display device having at least a dispersion film with a plurality of bar-like structures facing the light source. Thanks to the bar-like structures, the light beams passing through the dispersion film are scattered outwards, so that the brightness of the light beams passing through the dispersion film increases as the viewing angle increases. Therefore, the liquid crystal display device can display images with uniform brightness at various viewing angles.

These and other objects of the present invention will be apparent to those of ordinary skill in the art after having read the following detailed description of the preferred embodiment that is illustrated in the various figures and drawings.

DETAILED DESCRIPTION

Figure 5A:
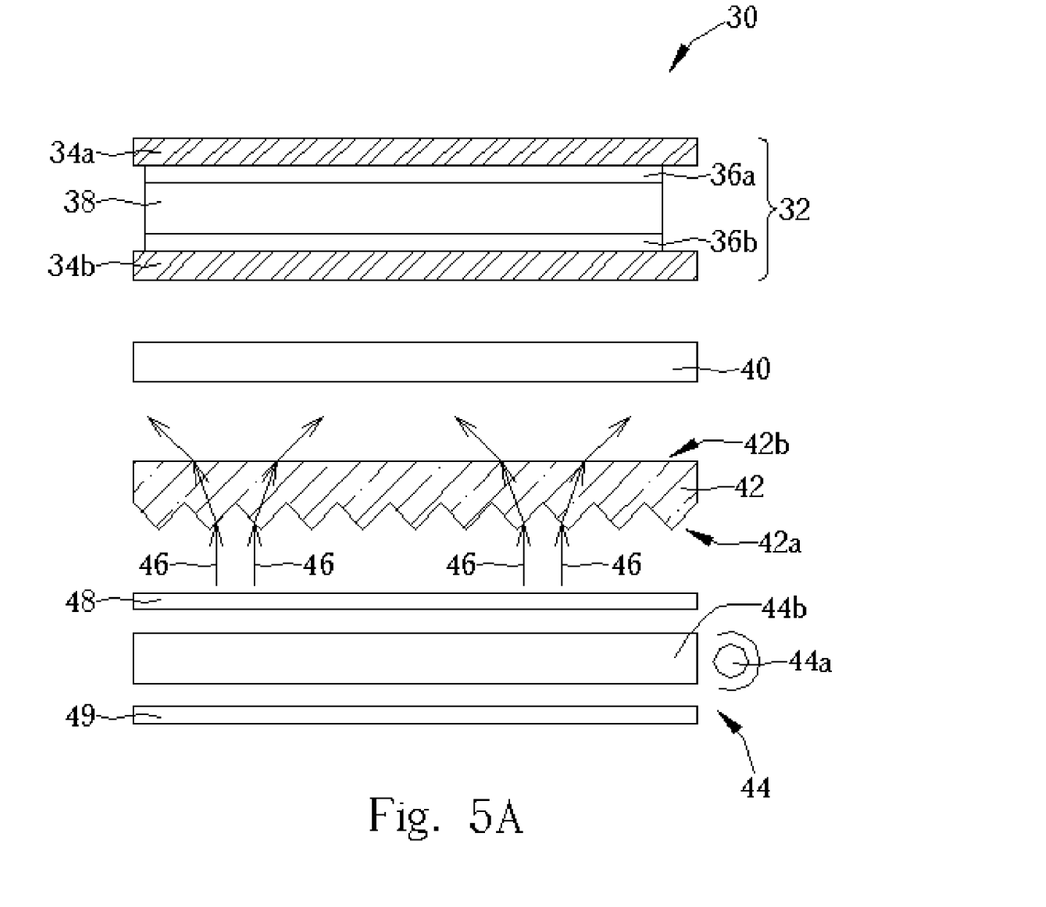
FIG. 5(A) and FIG. 5(B) are schematic diagrams of a liquid crystal display device according to the present invention.
Figure 5B:
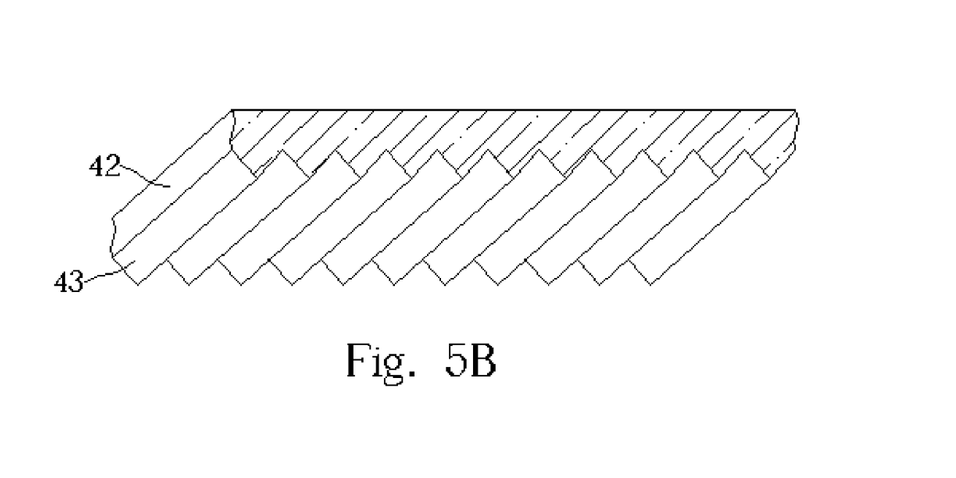

Referring to FIG. 5(A) and FIG. 5(B), FIG. 5(A) and FIG. 5(B) are schematic diagrams of a liquid crystal display device according to the present invention. As shown in FIG. 5(A), an LCD 30 comprises a liquid crystal display panel 32, a backlight module 44 positioned below the liquid crystal display panel 32, a diffuser 40 positioned between the liquid crystal display panel 32 and the backlight module 44, and a dispersion film 42 positioned between the diffuser 40 and the backlight module 44. As is known to those skilled in the art, the diffuser 40 is not a necessary element so that it can be omitted sometimes.

Additionally, the liquid crystal display panel 32 has an upper substrate 34a, a lower substrate 34b, and a liquid crystal layer 38 sealed between the upper substrate 34a and the lower substrate 34b. The liquid crystal display panel 32 further includes transparent conductive layers 36a and 36b respectively formed on a lower surface of the upper substrate 34a and an upper surface of the lower substrate 34b. As the conductive layers 36a and 36b are applied with a voltage, the orientations of the liquid crystal molecules can be regulated to control the light transmittance of each pixel unit so as to generate light beams with different gray levels or to generate red, blue, and green lights with different brightness, so that the LCD 30 can display plenty of images. The transparent conductive layers 36a and 36b both can be composed of indium tin oxide (ITO).

In addition, the backlight module 44 at least comprises a light source 44a for generating light beams, a light-guiding plate 44b for guiding the light beams, a diffuser 48 for equally distributing the light beams, and a reflective plate 49 for reflecting light beams into the liquid crystal display panel 32. The light source 44a can be a light emitting diode (LED) or a cold cathode fluorescent lamp (CCFL), and the light-guiding plate 44b is usually made of acrylic or a thin film of aluminum. In general, the LCD 30 further includes an upper polarizer (not shown) positioned on an upper surface of the liquid crystal display panel 32 and a lower polarizer (not shown) located between the liquid crystal display panel 32 and the back-light module 44. The upper polarizer and the lower polarizer are utilized for allowing polarized light with a particular polarized direction to pass through them.

It should be noted that the dispersion film 42 includes a rough surface 42a facing the backlight module 44, and a flat surface 42b facing the diffuser 40 according to the preferred embodiment of the present invention. Therefore, the light beams 46 generated by the backlight module 44 enter the dispersion film 42 via the rough surface 42a, and then, are emitted from the dispersion film 42 via the flat surface 42b. As shown in FIG. 5(B), the rough surface 42a has a plurality of bar-like structures 43 and a cross section of each bar-like structure 43 has a shape of a triangle that can be any kind of triangle, such as an equilateral triangle, a right-angled triangle, or an isosceles triangle. Furthermore, the dispersion film 42 is made of a pervious to light material with a better light transmittance such as a plastic film.

Figure 6:
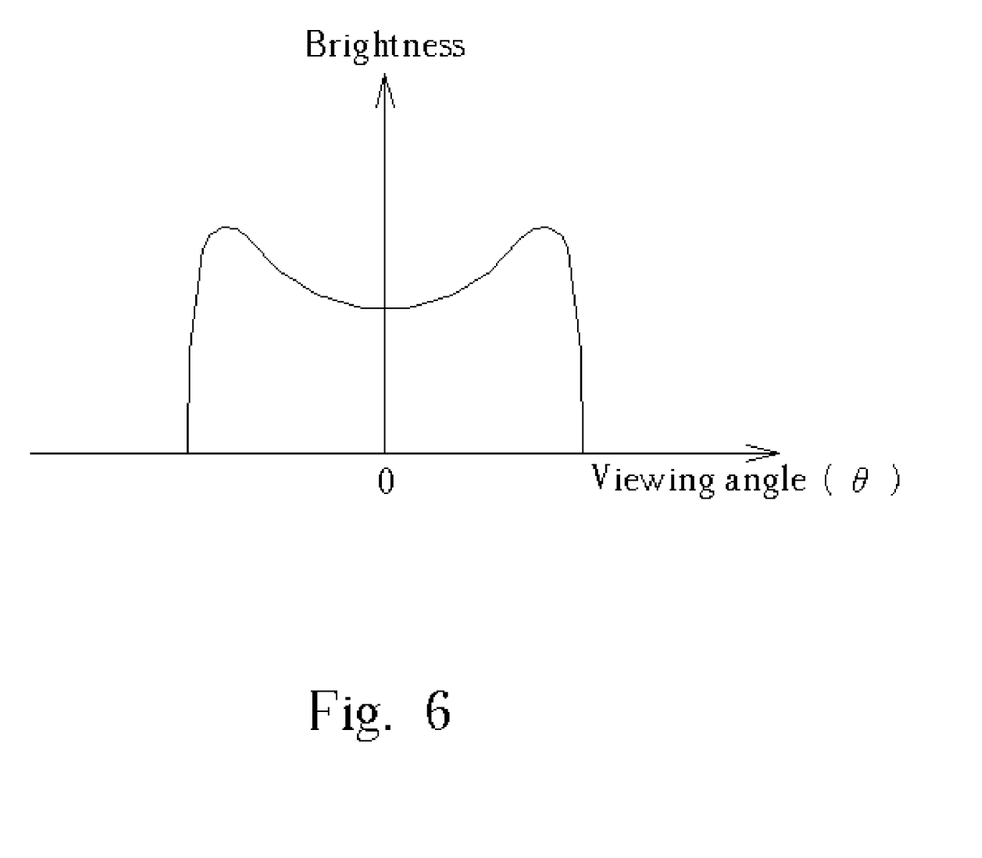
FIG. 6 illustrates the relationship between the brightness of the light beams 46 and the viewing angle.
Figure 7:
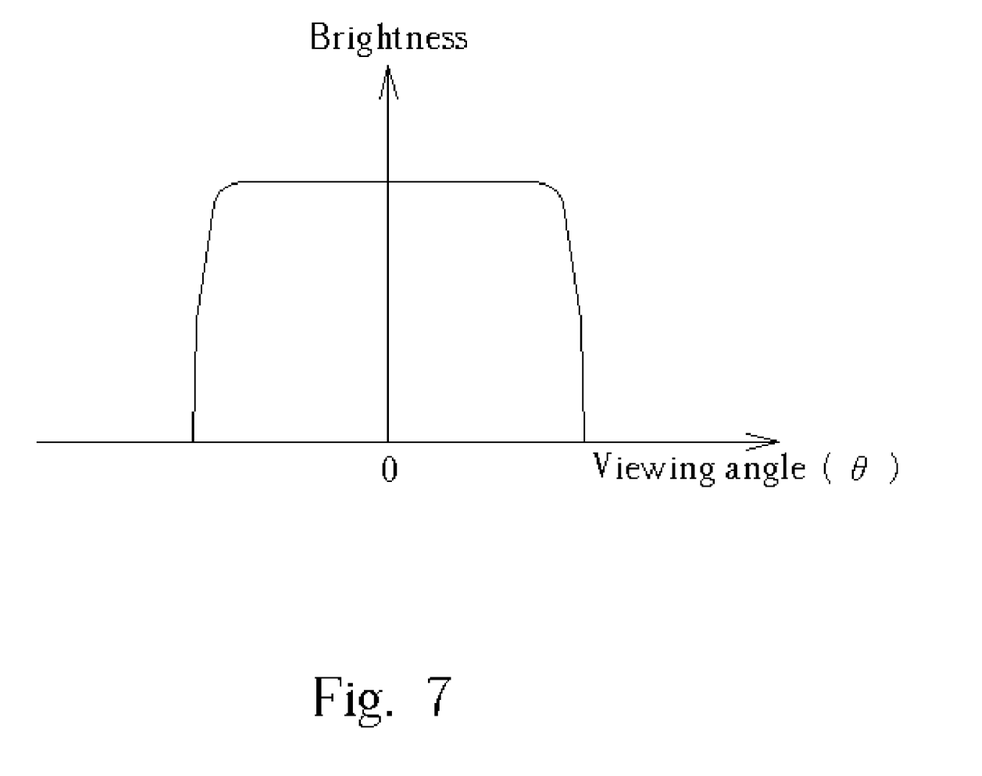
FIG. 7 is a simplified schematic diagram illustrating the relationship between the brightness displayed by the LCD 30 and a viewing angle (θ).

As shown in FIG. 5(A), the light beams 46 ejected from the dispersion film 42 are scattered outwards owing to the rough surface 42a and changes of mediums with different refractive indexes. Accordingly, as the light beams 46 leave the dispersion film 42 via the flat surface 42b, the brightness of the light beams 46 increases when the viewing angle increases and FIG. 6 illustrates the relationship between the brightness of the light beams 46 and the viewing angle. As a result, since the relationship between the viewing angle and the light transmittance of the liquid crystal display panel 32 is contrary to that between the viewing angle and the brightness of the light beams 46 emitted from the dispersion film 42, a user can always observe a uniform brightness from each viewing angle. Referring to FIG. 7, FIG. 7 is a simplified schematic diagram illustrating the relationship between the brightness displayed by the LCD 30 and a viewing angle (θ). As shown in FIG. 7, the LCD 30 can display images with uniform brightness at various viewing angles owing to the dispersion film 42.

Furthermore, the structure of the dispersion film of the present invention is not limited to that shown in FIG. 5(B). Referring to FIG. 8 to FIG. 14, FIG. 8 to FIG. 14 are structural diagrams illustrating the dispersion film according to another embodiments of the present invention.

Figure 8:
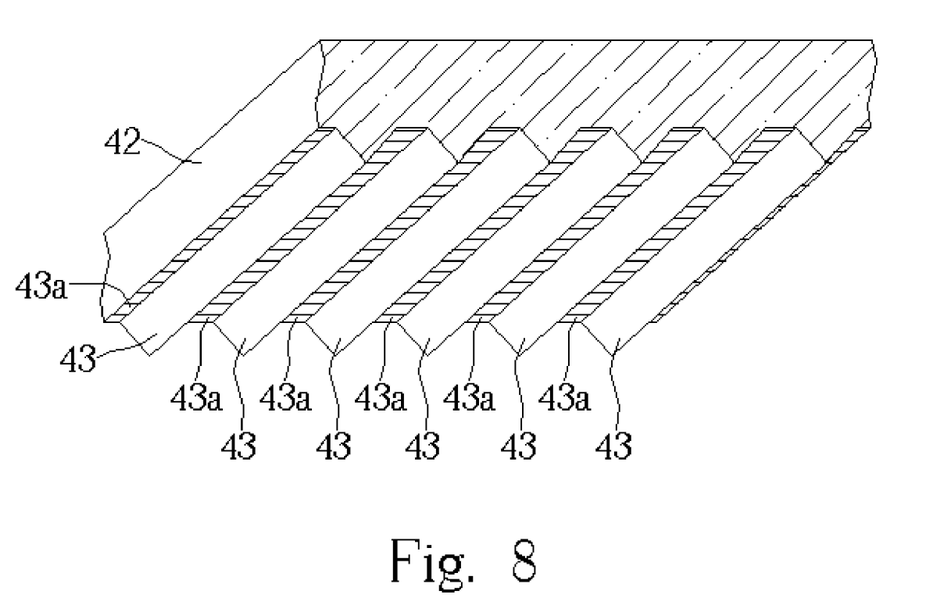
FIG. 8 to FIG. 14 are structural diagrams illustrating the dispersion film according to another embodiments of the present invention.
Figure 9:
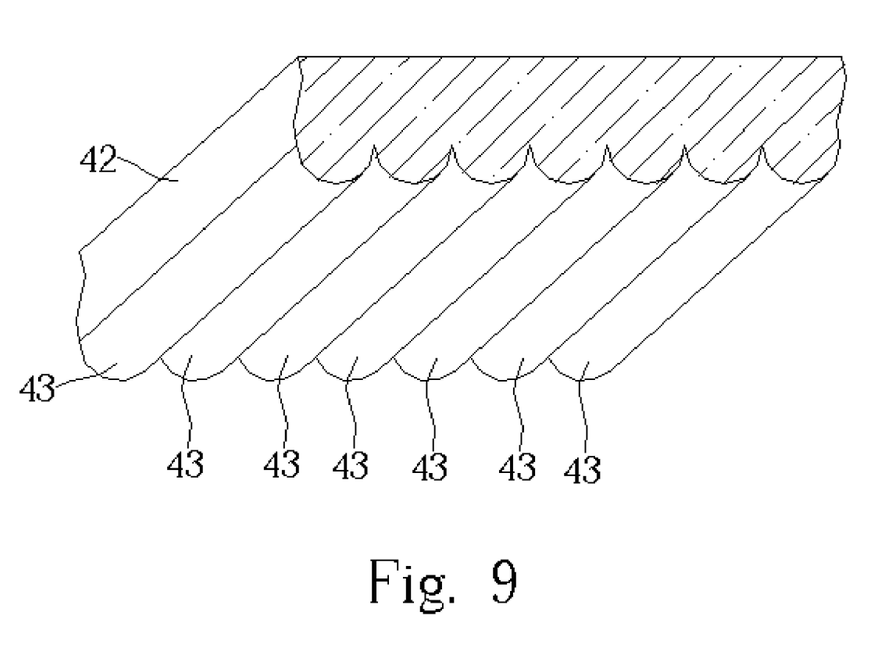
Figure 10:
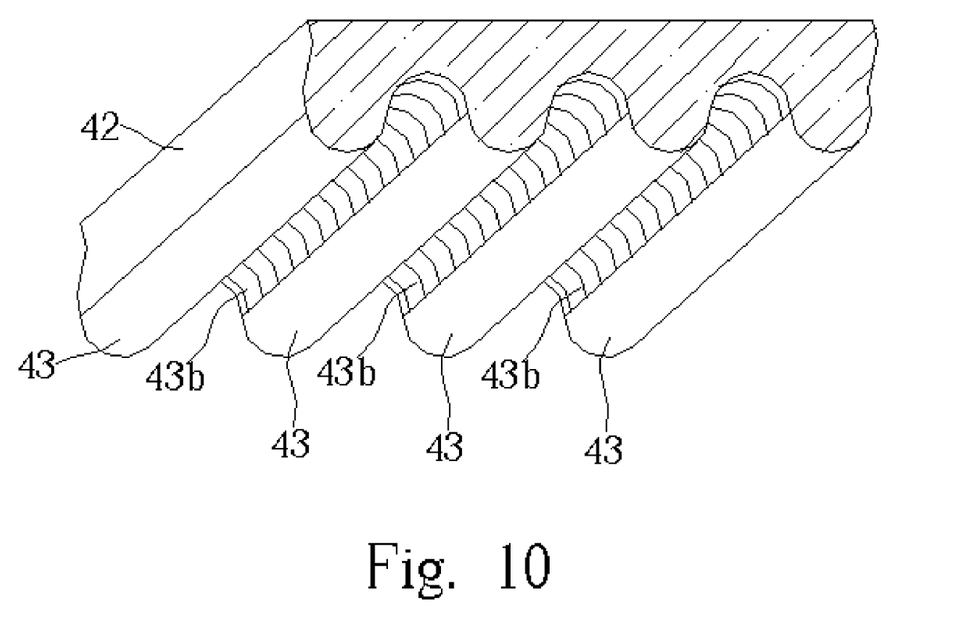
Figure 11:
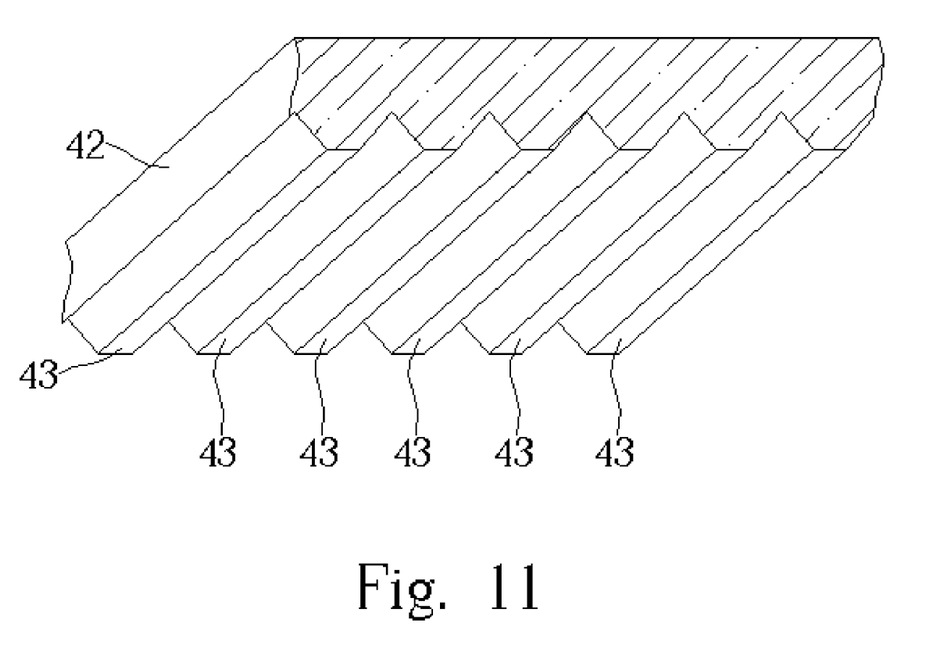
Figure 12:
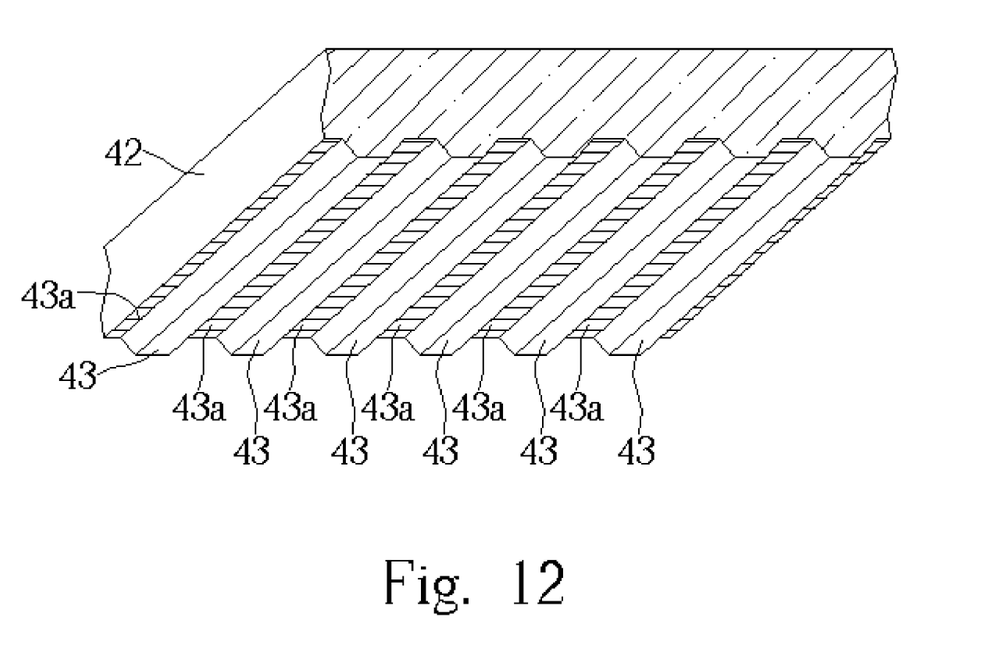
Figure 13:
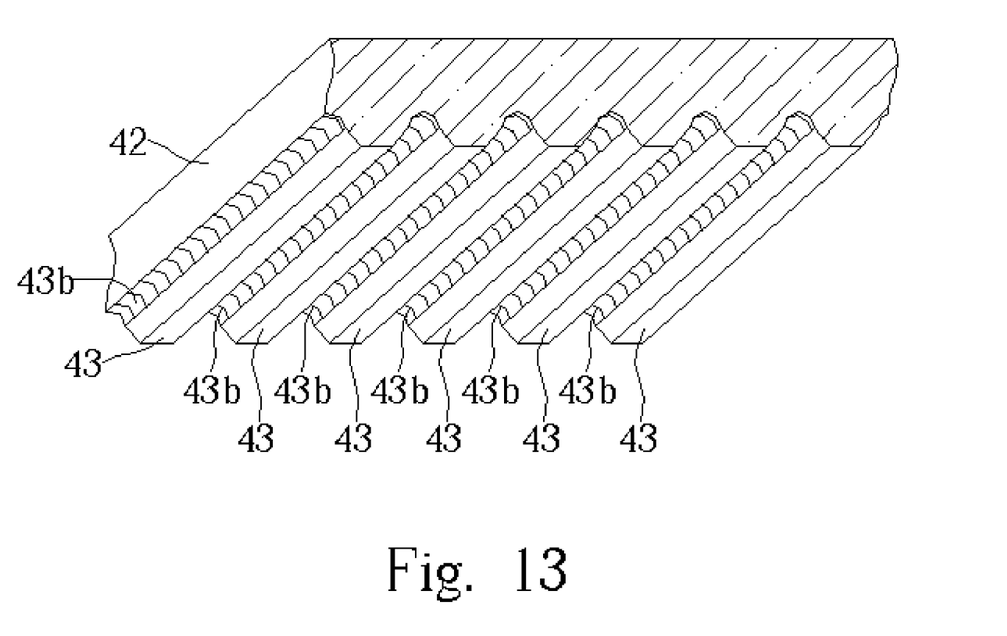

As shown in FIG. 8, the dispersion film 42 has a plurality of bar-like structures 43 and a cross section of each bar-like structure 43 has a shape of a triangle that can be any kind of triangle. Two adjacent bar-like structures 43 are apart from each other and are separated by a planar structure 43a. Since the cross section of each bar-like structure 43 is not limited to a triangle, the cross section of each of the bar-like structures can be a semicircular shape, such as a semicircle or a semi-ellipse, and two adjacent bar-like structures 43 are connected to each other, as shown in FIG. 9. Additionally, the two adjacent bar-like structures 43 can be apart from each other and be separated by a round depression 43b, as shown in FIG. 10. Furthermore, the cross section of each of the bar-like structures 43 can be a shape of a trapezoid, and two adjacent bar-like structures 43 are connected to each other, as shown in FIG. 11. Moreover, the two adjacent bar-like structures 43 can be apart from each other and be separated by a planar structure 43a, as shown in FIG. 12, or by a round depression 43b, as shown in FIG. 13. It should be noted that the bar-like structures 43 are not limited to linear structures and they can be bent structures or wavy structures.

Figure 14:
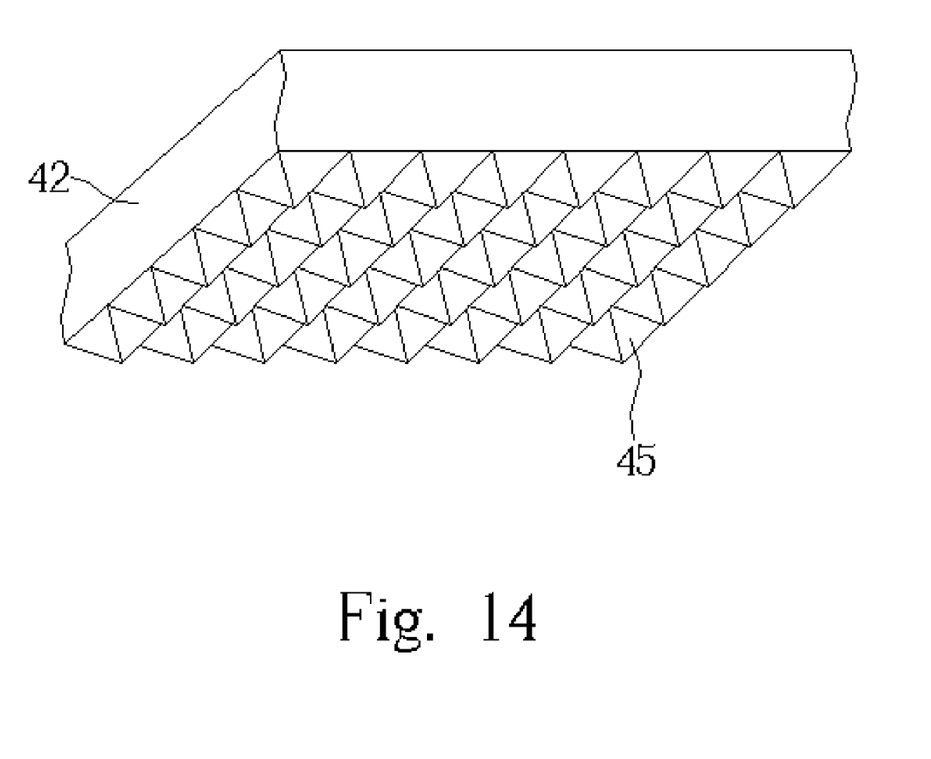

As shown in FIG. 14, the dispersion film 42 comprises a plurality of pyramid structures 45 that are arranged in a matrix. Therefore, the brightness of the light beams passing through the dispersion 42 having pyramid structures 45 increases as the viewing angle increases.

Figure 15:
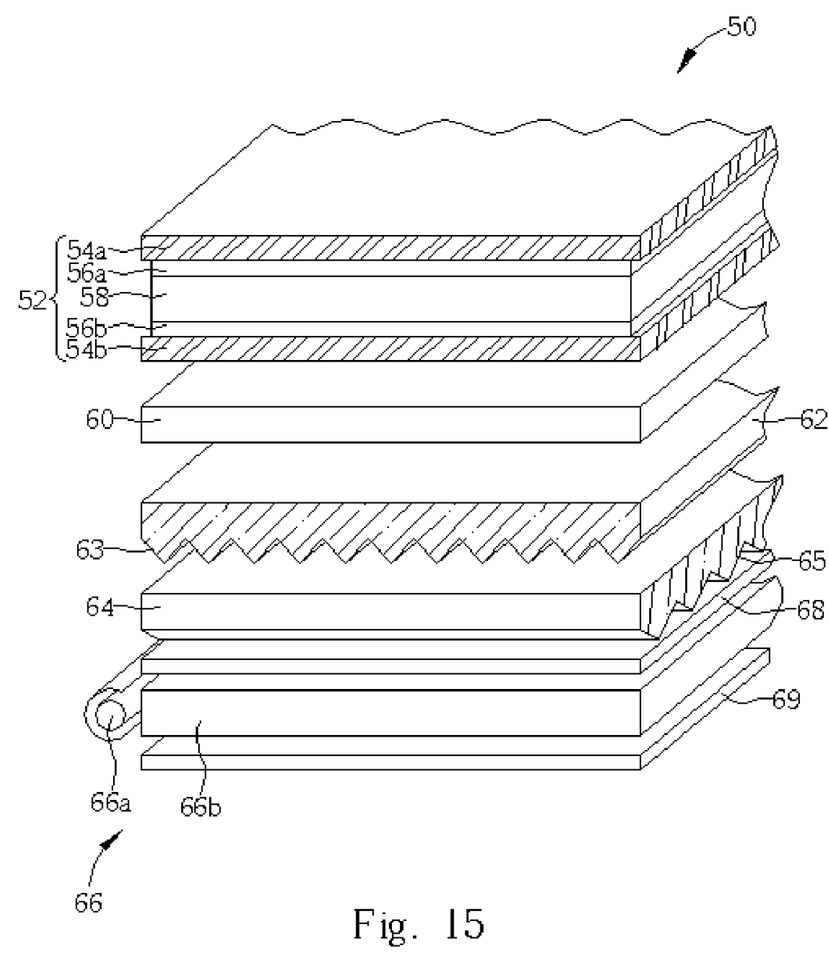
FIG. 15 is a schematic diagram of a liquid crystal display device according to another embodiment of the present invention.

Referring to FIG. 15, FIG. 15 is a schematic diagram of a liquid crystal display device according to another embodiment of the present invention. As shown in FIG. 15, an LCD 50 comprises a liquid crystal display panel 52, a backlight module 66 positioned below the liquid crystal display panel 52, a diffuser 60 positioned between the liquid crystal display panel 52 and the backlight module 66, and dispersion films 62, 64 positioned between the diffuser 60 and the backlight module 66. Additionally, the liquid crystal display panel 52 has an upper substrate 54a, a lower substrate 54b, and a liquid crystal layer 58 sealed between the upper substrate 54a and the lower substrate 54b. The liquid crystal display panel 32 further includes transparent conductive layers 56a and 56b respectively formed on a lower surface of the upper substrate 54a and an upper surface of the lower substrate 54b. The transparent conductive layers 56a and 56b both can be composed of indium tin oxide (ITO). In addition, the backlight module 66 at least comprises a light source 66a for generating light beams, a light-guiding plate 66b for guiding the light beams, a diffuser 68 for uniformly distributing the light beams, and a reflective plate 69 for reflecting light beams into the liquid crystal display panel 52. The light source 66a can be a light emitting diode (LED) or a cold cathode fluorescent lamp (CCFL), and the light-guiding plate 66b is usually made of acrylic. Generally, the LCD 50 further includes an upper polarizer (not shown) positioned on an upper surface of the liquid crystal display panel 52 and a lower polarizer (not shown) located between the liquid crystal display panel 52 and the back-light module 66.

The LCD 50 includes two dispersion films 62 and 64 positioned between the liquid crystal display panel 52 and the backlight module 66, which is a major difference between the LCD 30 of FIG. 5(A) and the LCD 50. The dispersion films 62 and 64 respectively have a plurality of bar-like structures 63 and 65 that face the backlight module 66. The bar-like structures 63 are perpendicular to the bar-like structures 65. Therefore, the brightness of the light beams passing through the dispersion films 63 and 65 increases along both of the X-axis and the Y-axis as the viewing angle increases. As shown in FIG. 15, each of the dispersion films 62 and 64 has a cross section of triangular shape, and the dispersion films 62 and 64 are made of plastic. Furthermore, the structures of the bar-like structures 63 are not necessarily the same as those of the bar-like structures 65. The dispersion films 63 and 65 can be any one of the structures selected from FIG. 8 to FIG. 14.

In comparison with the prior art, the LCD according to the present invention has at least a dispersion film positioned between a liquid crystal display panel and a light source. The dispersion film comprises a plurality of bar-like structures or pyramid structures facing the light source. Thanks to the bar-like structures and the pyramid structures, the light beams passing through the dispersion film are scattered outwards, so that the brightness of the light beams passing through the dispersion film increases as the viewing angle increases. Therefore, the LCD can display images with uniform brightness at various viewing angles.

Those skilled in the art will readily observe that numerous modifications and alterations of the device may be made while retaining the teachings of the invention. Accordingly, the above disclosure should be construed as limited only by the metes and bound of the appended claims.

What is claimed is:

1. A liquid crystal display device comprising:
a liquid crystal display panel having two parallel substrates and a liquid crystal layer sealed between the substrates;
a light source for generating light beams;
a dispersion film positioned between the liquid crystal display panel and the light source having a plurality of bar-like structures arranged along a first direction and facing the light source; and
a first diffuser positioned between the dispersion film and the liquid crystal display panel;
wherein the dispersion film is utilized for enabling brightness of the light beams generated from the light source to be increased when a viewing angle is increased, and further utilized for enabling the liquid crystal display device to display an image with uniform brightness.

2. The liquid crystal device of claim 1, wherein the first diffuser is for uniformly distributing light beams that pass through the dispersion film.

3. The liquid crystal display device of claim 1 wherein the dispersion film is a second diffuser.

4. The liquid crystal display device of claim 1 further comprising a light-guiding plate positioned between the light source and the dispersion film for guiding the light beams generated by the light source, a third diffuser positioned between the light-guiding plate and the dispersion film for uniformly distributing the light beams, and a reflective plate positioned under the light-guiding plate for reflecting light beams into the liquid crystal display panel.

5. The liquid crystal display device of claim 1 wherein a cross section of each of the bar-like structures along a second direction that is perpendicular to the first direction has a shape of a triangle.

6. The liquid crystal display device of claim 1 wherein a cross section of each of the bar-like structures along a second direction that is perpendicular to the first direction has a shape of a trapezoid.

7. The liquid crystal display device of claim 6 wherein two adjacent trapezoids among the trapezoids are separated by a round depression.

8. The liquid crystal display device of claim 1 wherein a cross section of each of the bar-like structures along a second direction that is perpendicular to the first direction has a shape of a semicircle.

9. The liquid crystal display device of claim 1 wherein each of the bar-like structures comprises a linear structure, a bent structure, or a wavy structure.

10. The liquid crystal display device of claim 1 wherein the dispersion film comprises a plastic film.

11. A liquid crystal display device comprising:
a liquid crystal display panel having two parallel substrates and a liquid crystal layer sealed between the substrates;
a light source for generating light beams;
a first dispersion film positioned between the liquid crystal display panel and the light source having a plurality of first bar-like structures arranged along a first direction and facing the light source; and
a second dispersion film positioned between the first dispersion film and the light source having a plurality of second bar-like structures arranged along a second direction and facing the light source;
wherein the first direction is approximately perpendicular to the second direction, and the first dispersion film and the second dispersion film are utilized for enabling brightness of the light beams generated from the light source to be increased when a viewing angle is increased and further utilized for enabling the liquid crystal display device to display an image with uniform brightness.

12. The liquid crystal display device of claim 11 wherein a cross section of each of the first bar-like structures along the second direction comprises a shape of a triangle, a trapezoid, or a semicircle.

13. The liquid crystal display device of claim 11 wherein a cross section of each of the second bar-like structures along the first direction comprises a shape of a triangle, a trapezoid, or a semicircle.

14. The liquid crystal display device of claim 11 wherein each of the first bar-like structures and the second bar-like structures comprises a linear structure, a bent structure, or a wavy structure.

15. The liquid crystal display device of claim 11 further comprising a light-guiding plate positioned between the light source and the second dispersion film for guiding the light beams generated by the light source, a diffuser positioned between the light-guiding plate and the second dispersion film for uniformly distributing the light beams, and a reflective plate positioned under the light-guiding plate for reflecting light beams into the liquid crystal display panel.

16. The liquid crystal display device of claim 11 wherein each of the first dispersion film and the second dispersion film comprises a plastic film.

17. A liquid crystal display device comprising:
- a liquid crystal display panel having two parallel substrates and a liquid crystal layer sealed between the substrates;
- a light source for generating light beams; and
- a dispersion film positioned between the liquid crystal display panel and the light source having a plurality of pyramid structures facing the light source;
- a light-guiding plate positioned between the light source and the dispersion film for guiding the light beams generated by the light source;
- a diffuser positioned between the light-guiding plate and the dispersion film for uniformly distributing the light beams; and
- a reflective plate positioned under the light-guiding plate for reflecting light beams into the light crystal display panel;
- wherein the dispersion film is utilized for enabling brightness of the light beams generated from the light source to be increased when a viewing angle is increased, and further utilized for enabling the liquid crystal display device to display an image with uniform brightness.

18. The liquid crystal display device of claim 17 wherein the dispersion film comprises a plastic film.

19. The liquid crystal display device of claim 17 wherein the pyramid structures are arranged in a matrix.

* * * * *